United States Patent [19]
Fujimoto

[11] 3,829,779

[45] Aug. 13, 1974

[54] MULTILEVEL CODE TRANSMISSION SYSTEM

[75] Inventor: Hiroshi Fujimoto, Tokyo, Japan

[73] Assignee: Nippon Electric Company, Limited, Tokyo, Japan

[22] Filed: Feb. 1, 1973

[21] Appl. No.: 328,809

[30] Foreign Application Priority Data

Feb. 4, 1972 Japan .............................. 47-13015

[52] U.S. Cl. .......... 325/38 A, 340/347 DD, 325/42, 178/68

[51] Int. Cl. .......................... H04b 1/62, H04b 1/66

[58] Field of Search ............. 325/38 A, 42; 178/68; 340/347 DD

[56] References Cited

UNITED STATES PATENTS

| | | | |
|---|---|---|---|
| 3,388,330 | 6/1968 | Kretzmer | 325/42 |
| 3,462,687 | 8/1969 | Becker et al. | 178/68 |
| 3,492,578 | 1/1970 | Gerrish et al. | 325/38 A |
| 3,573,622 | 4/1971 | Holzman et al. | 325/38 A |
| 3,588,702 | 6/1971 | Tisi et al. | 325/38 A |
| 3,679,977 | 7/1972 | Howson | 325/42 |
| 3,697,874 | 10/1972 | Kaneko | 325/38 A |
| 3,720,875 | 3/1973 | Franaszek et al. | 178/68 |

*Primary Examiner*—Malcolm A. Morrison
*Assistant Examiner*—Vincent J. Sunderdick
*Attorney, Agent, or Firm*—Sughrue, Rothwell, Mion, Zinn & Macpeak

[57] ABSTRACT

A multilevel code transmission system is made capable of transmission and reception of correct signals even if the demodulation carrier is 180 degrees out of phase by dividing the levels of a multilevel code to be transmitted into pairs and subjecting the transmission signal to differential coding, pair by pair. At the receiver, the levels are again divided into pairs, and the differentially coded signal is inversely converted.

5 Claims, 8 Drawing Figures

MULTILEVEL CODE TRANSMISSION SYSTEM

The present invention relates to data transmission systems using multilevel codes and, more particularly, to data transmission systems using partial response system of the (1, 0, −1) formula, or class IV partial response system in which the multilevel signal is transmitted as VSB or SSB modulated-wave, and the signal received at the receiver is demodulated through synchronous coherent detection.

Description of the Prior Art:

This type of partial response system is in use in such a manner that a "1" level code, for example, is transmitted in a certain time slot, and then a "−1" level code is transmitted in a time slot with a delay of $2T$ (where $T$ is an interval of time slot) following the first time slot. Thus, in this system, the frequency spectrum in the base band of the multilevel code becomes zero at the frequency of zero and $fo/2$ (where $f_o = 1/T$), exhibiting a sinusoidal amplitude distribution in the frequency region lying between these two frequencies. This dispenses with the need for transmitting a dc component and allows the frequency band to be effectively used. One typical prior-art partial response system is described in "A New Signal Format for Efficient Transmission" by F. K. Becker, E. R. Kretzmer and J. R. Sheehan, B.S.T.J., vol. XLV, No. 5, pp 755–758. Generally, this type of partial response system provides a multilevel signal in the following manner. In the transmission base band region, 1. an N-level signal is applied to a bandpass filter whose frequency characteristic can be given by $$X(W)=\begin{cases} A \text{ Sin } WT \left(\text{at } 0 \leq W \leq \frac{\pi}{T}\right) \\ 0\left(\text{at } W \geq \frac{\pi}{T}\right) \end{cases}$$

where, $A$ is a positive constant, and $W = 2\pi f$ ($f$ is the frequency); or 2. a multilevel signal delayed by $2T$ through a delay element and then polarity inverted is added to the original multilevel signal and then is applied to a low pass filter capable of filtering frequency components lying in the region above $fo/2$. Thus, the frequency spectrum becomes zero at the above-mentioned frequencies zero and $fo/2$, and exhibits a sinusoidal distribution between these two frequencies. The levels of the multilevel signal become (2N − 1) kinds, that is −(N − 1), −(N − 2), . . . , 0, . . . , (N − 2) and (N − 1). While, in the receiver base band region, a signal preceding by $2T$ which has been delayed through a delay element is added to the signal received, whereby the original N-level signal is reproduced. In this receiving operation, if error occurs with one digit in the transmission channel, such error remains as it is in the loop comprising a summing circuit and a delay element, with the result that error appears repeatedly in the output multilevel signal at intervals of every other digit, in the position after the faulty digit. To solve this problem, the precoding concept is associated with the partial response system. The precoding is a coding process in which, at the transmitter, modulo-N summation is performed on the input and output signals, the input signal being N-level: 0, . . . , ($N$−1), and the output signal preceding by $2T$ which has been delayed through a delay element. The modulo-N summation is taken to mean a summation, the result of which is given in X′, as follows, in relation to X which is the result of usual summation of more than two inputs:

$$X' = X \; (0 \leqq X < N)$$
$$X' = X - N \; (N \leqq X < 2N)$$

$$X' = X - mN \quad (mN \leqq X < (m+1)N),$$

where $m$ is an integer.

Accordingly, the summing output of modulo-$N$ also is an $N$-level signal of 0, . . . , (N−1). This summing output is coded by partial response system through procedure 1 or 2 as stated above. Then, on the receiver side, modulo-$N$ summation is performed on the signal received and N in order to derive the original data from the signal of 2N − 1 levels: −(N−1), . . . , 0, . . . , ($N$ − 1). This operation is carried out without resorting to the loop which preserves the error digit, and possibilities of causing error propagation are eliminated (Reference: "Generalization of a Technique for Binary Data Communication" by E. R. Kretzmer, IEEE Transactions on Communication Technology, 1966, pp 67–68).

Such a base band signal affected by the preceding and partial response coding procedures is usually modulated by an SSB or VSB amplitude modulator. Then it is a general practice on the receiving side to have the demodulator for the synchronized coherent detection of the base band signal. In this transmission system, the frequency information on the demodulation carrier is supplied in the form of for example, a pilot signal. But in some cases, the phase information is not transmitted. In such a case, the presence of quadrature components in the demodulated base band signal is detected on the receiving side and the carrier phase is controlled so that the quadrature component is held to zero. It is impossible for this method, however, to judge whether the carrier phase is correctly controlled or deviated by 180° (Reference: "Principles of Data Communication" by R. W. Lucky, J. Saly and E. J. Weldon, Jr., Mcgraw-Hill Book Co). If the demodulation carrier is out of phase by 180°, the demodulated base band signal is polarity-inverted. In the foregoing partial response system in which modulo-$N$ summation is performed on the receiving base band signal and $N$, the levels $j$ and $N - j$ (where $j$ is a positive integer smaller than N/2) are inverted in the output signal, excepting zero level when $N$ is odd, and $N/2$ level when $N$ is even, if the input signal is polarity-inverted. In consequence, correct data cannot be obtained.

SUMMARY OF THE INVENTION

In view of the foregoing, a general object of the invention is to provide a multilevel code transmission system capable of transmission and reception of correct signals even if the demodulation carrier is out of phase by 180°, in the transmission band of the multilevel signal using the foregoing partial response system through, for example, amplitude modulation.

Briefly, the feature of this invention lies in that, at the transmitter, all level components excluding the zero or N/2 level components of the modulo-M-operation-processed incoming reception signal, are divided into pairs of $i$ and $N - i$, and the differentially coded signal is inversely converted, whereby an output multilevel signal is obtained. In this operation, the zero or $N/2$ levels are not produced. However, for the purpose of establishing integrity of circuitry, the zero level and the $N/2$ level may be treated as one of the pairs.

The differential coding at the transmitter is performed in the following manner. For example, when an input multilevel signal is at $i$ level, either the preceding $N-i$ level or the $i$ level output signal is taken directly as the output. While, when the input is at the $N-i$ level, the preceding $N-i$ or $i$ level output signal is inverted and the $i$ level signal is taken as the output when the preceding output signal is at the $N-i$ level, or the $N-i$ level signal is taken as the output when the preceding output signal is at the $i$ level.

The differentially coded signal is inversely converted at the receiver in the following manner. When the input multilevel signal to the inverse conversion circuit is at the $i$ level or the $N-i$ level, this level is compared with the preceding $i$ level or $N-i$ level. When the comparison results in coincidence, the output is at the $i$ level. Whereas, when the comparison results in non-coincidence, the output is at the $N-i$ level. The relationship between the output level and the result of comparison (i.e., coincidence or non-coincidence) may be determined reversely according to the conversion on the transmission side.

When the differential coding at the transmitter and the inverse conversion at the receiver are employed, the coincidence or non-coincidence within the pair of $i$ level and $N-i$ level in the received input data to the inverse conversion circuit is not affected regardless of whether the demodulation carrier stands at the correct phase or at a phase deviating by 180°. Hence the inverse conversion circuit can designate the $i$ level or the $N-i$ level for its output according to the coincidence/non-coincidence data and thus can reproduce correct data. In this case, if one digit error takes place in the $i$ or $N-i$ levels to propagate to the $i'$ or $N-i'$ (levels where $i' \neq i$) in the transmission channel, the data error which may occur after the inverse conversion is confined only to the error digit and the following digit of $i$ or $N-i$ levels and of $i'$ or $N-i'$ levels. There is no possibility of causing further error propagation.

BRIEF DESCRIPTION OF THE DRAWINGS

The features and advantages of the invention will more specifically be described by referring to the accompanying drawings wherein.

DESCRIPTION OF THE PREFERRED EMBODIMENTS

Figure 1:
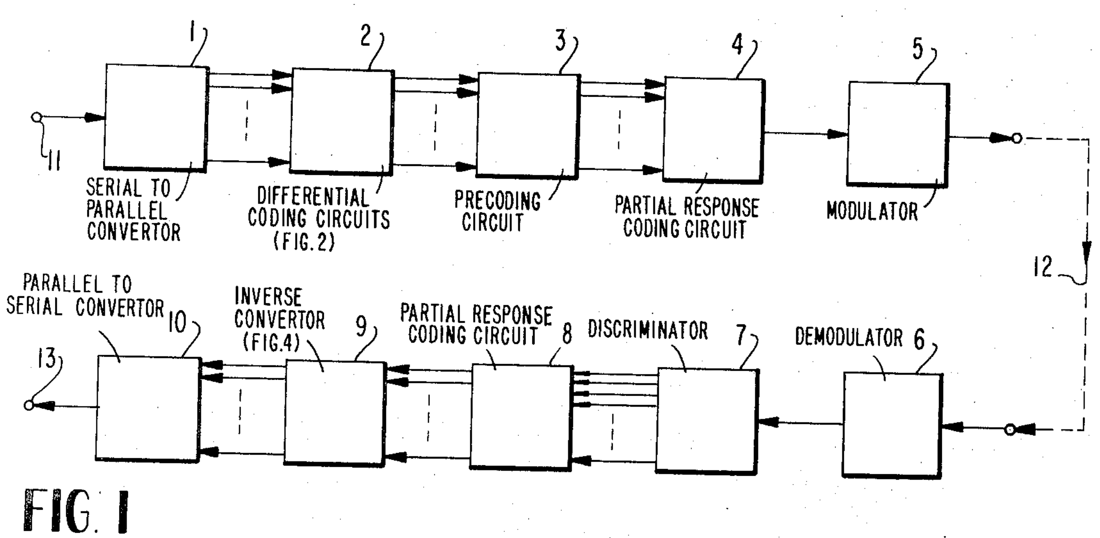
FIG. 1 is a block diagram of a multilevel code transmission system according to the invention.

Referring to FIG. 1, the data to be transmitted is supplied in the form of a binary signal to a serial to parallel converter 1 via an input terminal 11. The converter 1 converts this signal into parallel binary signals in the number corresponding to the number of levels $N$ of the multilevel signal. The parallel binary signals are treated in a differential coding circuit 2 and supplied through a precoding circuit 3 to a partial response coding circuit 4, which comprises multilevel pulse generators, whereby a base band signal is formed. This base band signal is subjected, for example, to AM-SSB modulation in a modulator 5. The modulator 5 superposes a necessary pilot signal on the modulated signal and supplies its output to a transmission channel 12. A demodulator 6 performs the coherent detection over the signal transmitted over the channel 12 and obtains the base band signal. A discriminator 7 discriminates each digit of the base band signal with respect to its level among $(2N-1)$ numbers of levels. The resultant signal is decoded into a multilevel signal of $N$-level by a partial response decoding circuit 8 which, as described, performs modulo-$N$ summation of the signal and $N$. This multilevel signal is converted into a binary signal by a parallel to serial converter 10 via an inverse converter circuit 9 for the differential coding operation. The binary data signal is an output to be supplied through a terminal 13 to a terminal device. Circuits 2 and 9 will further be described below by referring to FIGS. 2 and 4. Other circuits are not further described since the operations of these circuits are apparent from the foregoing description regarding the partial response system, as well as from the prior art in transmission circuits.

Figure 2:
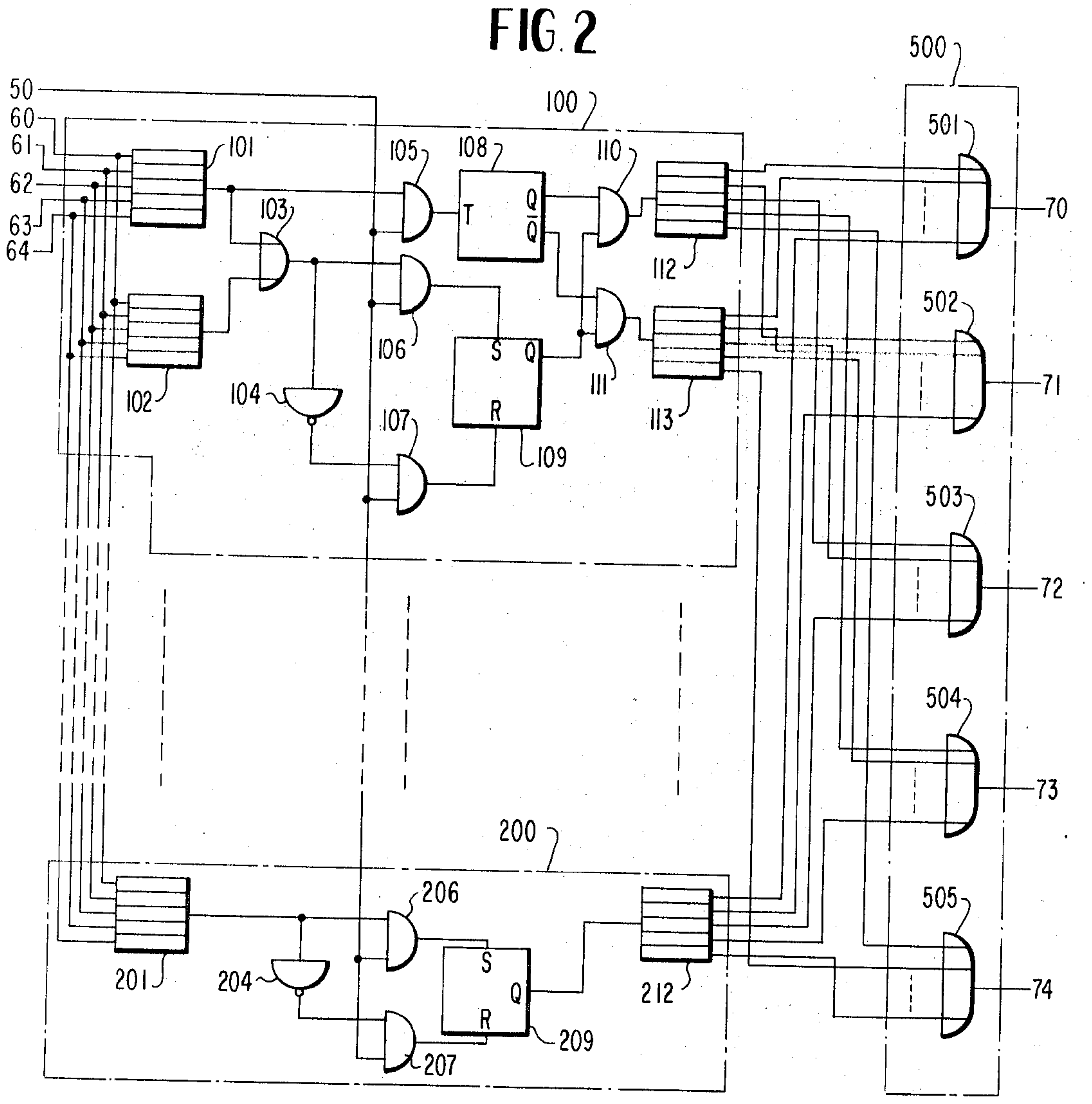
FIG. 2 is a circuit diagram illustrating the differential coding operation in the transmitter of the multilevel code transmission system of this invention.

In FIG. 2, which shows the transmitter of the system, the numeral 100 denotes a differential coding block; 200, a passing block for passing data signals at zero level when $N$ is an odd number, or at $N/2$ level when N is an even number; and 500, a collective block for gathering outputs from the other blocks and producing the output signals. The numerals 101, 102 and 201 denote code pattern detecting circuits, to which the parallel binary signals indicating a multilevel signal are supplied through, for example, terminals 60–64. When the pattern of this binary signals is coincident with a specific code pattern, the pattern detecting circuits generate a "1" output. As well known, these circuits are made up of AND circuits. In this example, the circuits 101, 102 and 201 correspond to $N-i$ level, $i$ level and zero level respectively. The numerals 103, 501 through 505 represent OR circuits; 104 and 204, NOT circuits; 105 through 107, 110, 111, 206 and 207, AND circuits; 108, a flip-flop circuit with its state inverted by a pulse input to its terminal T, thereby making the outputs available complementarily at terminals Q and $\overline{Q}$. Also provided are flip-flop circuits 109 and 209 which deliver a "1" output from the terminal Q when a pulse comes in at the terminal S, or "0" output when a pulse comes in at the terminal R. The numerals 112, 113 and 212 denote code pattern generator circuits which generate a parallel output of specific pattern when the input is "1," or all "0" output when the input is "0." For pattern generation, these circuits depend in general on the presence or absence of connection between the input and output terminals. In this example, the circuits 112, 113 and 212 correspond to $N-i$ level, $i$ level and zero level respectively.

Figure 4:
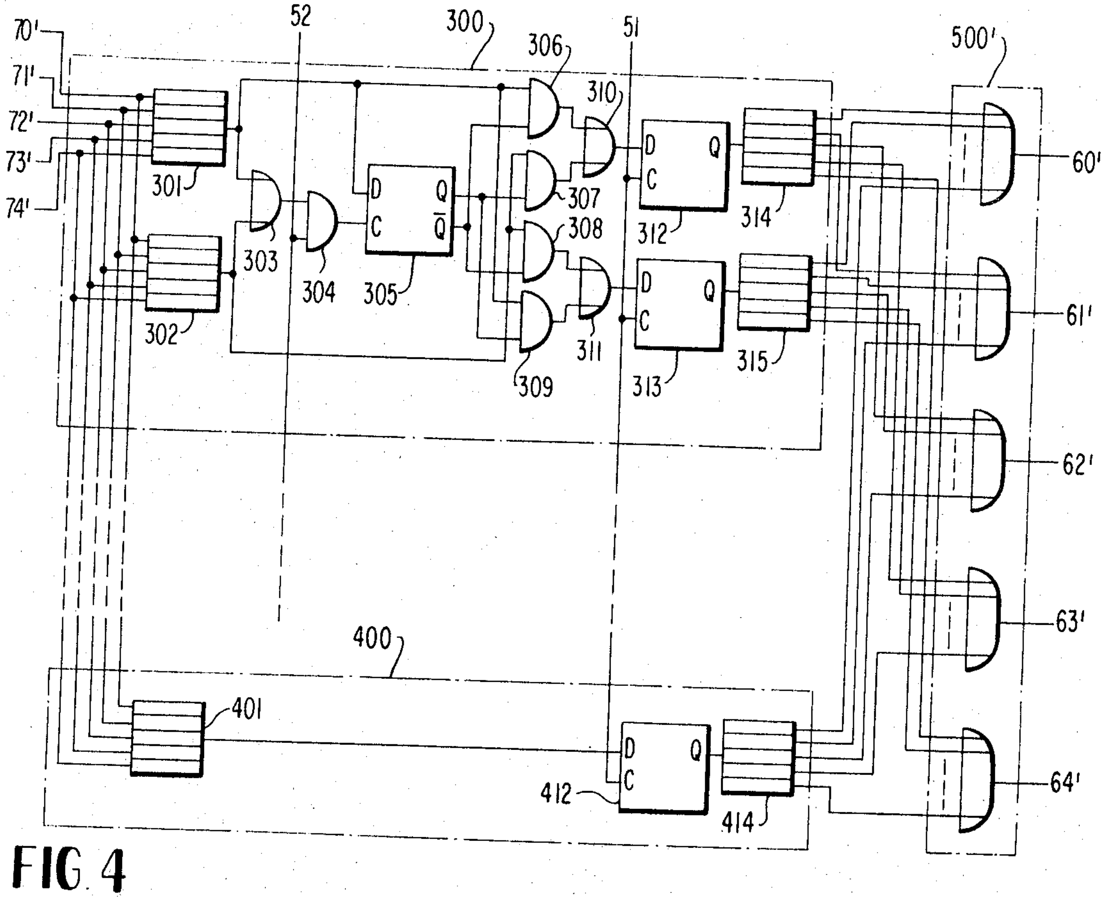
FIG. 4 is a circuit diagram illustrating the inverse conversion operation in the receiver of the multilevel code transmission system of this invention.
Figure 3:
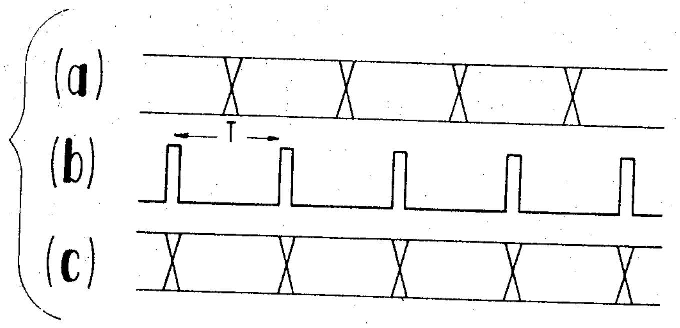
FIG. 3 is a waveform diagram illustrating the operation of the circuit of FIG. 2.

FIG. 3 illustrates the timing relationship between the clock pulses and the changing points (as indicated by $x$) of input and output signals. The clock pulses (FIG. 3*b*) in the time position where the inputs (FIG. 3*a*) to the terminals 60 through 64 are correctly read out is supplied to a terminal 50. In the block 100, when the detection output of $N-i$ level or $i$ level is read by the clock pulse, the flip-flop 109 is set and a "1" output is generated at the output terminal Q. Thus, either pattern of the $N-i$ level or the $i$ level indicating signal is delivered according to the state of the flip-flop 109. When the $N-i$ level is detected, the flip-flop 108 inverts its state at the clock pulse timing. Accordingly, the same output as the preceding $i$ level or $N-i$ level indicating signal is delivered when an $i$ level input comes in. While, when an $N-i$ level input comes in, an $N-i$ level indicating signal is delivered in case the preceding one is at $i$ level, or an $i$ level indicating signal is provided in case the preceding one is at $N-i$ level. In this manner, the differential coding is performed pair by pair as described previously. In the block 200, the zero level detection data is read by the clock pulse, a "1" output is generated at the terminal Q of the flip-flop 209, and a zero level indicating signal is delivered. The block 500 comprises OR circuits 501 through 505 corresponding to the necessary number of bits for signifying a multilevel signal in terms of a binary parallel signal. These OR circuits generate an OR signal through logic on the bit outputs corresponding to the individual pattern generator circuits. The output timings in this operation are shown by (c) of FIG. 3. In FIG. 4, which shows the block 9 of FIG. 1, the numeral 300 is a differential inverse conversion block, and 400 is a passing block corresponding to the block 200 of FIG. 2. Parallel inputs 70' through 74' which correspond to the outputs 70 through 74 in FIG. 2 are connected in parallel to input code pattern detection circuits 301, 302 and 401 as in FIG. 2, and the outputs of code pattern generator circuits 314, 315 and 414 of each block are connected to a collective block 500' which is similar to the block 500 of FIG. 2. Thus, output signals 60' through 64' corresponding to the input signals 60 through 64 of FIG. 2 are obtained as the output of the block 500'. The pattern detection circuits 301, 302 and 401 are similar to the circuits 101, 102 and 201 of FIG. 2, and correspond to the $N-$i level, the $i$ level and the zero level respectively. The numerals 303, 310 and 311 denote OR circuits; 305, 312, 313 and 412, edge trigger type D-flip-flop circuits which hold a D input at the leading edge (or trailing edge) of the clock pulse applied to the terminal C, and generates an output at the terminal Q. The complimentary output of the flip-flop 305 is delivered from the terminal $\overline{Q}$. The numerals 304 and 306 through 309 denote AND circuits. The pattern generator circuits 314, 315 and 414 are similar to the circuits 112, 113 and 212 of FIG. 2, and correspond to the $N-i$ level, the $i$ level and the zero level respectively.

Figure 5:
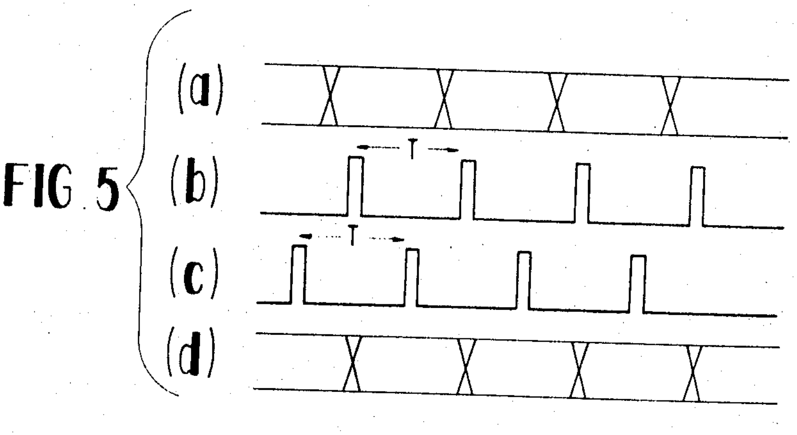
FIG. 5 is a waveform diagram illustrating the operation of the circuit of FIG. 4.

To operate this inverse conversion circuit, two kinds of clock pulses applied to terminals 51 and 52 are used. FIG. 5 shows the timing relationship between these clock pulses and input and output signals. It is assumed that the pulse of FIG. 5*b* comes before the pulse of FIG. 5*c* in the interval of input data signal (FIG. 5*a*). Then, in the block 300, a detection data of the preceding $i$ level or $N-i$ level is stored in the flip-flop 305 in terms of "0" at its terminal Q when it is the $i$ level, or in terms of "1" when it is the $N-i$ level. When an $i$ level or $N-i$ level is detected from the input signal, the detected circuit is compared with the content of the flip-flop 305. The resultant non-coincidence or discoincidence is read by the clock pulse on line 51 at the flip-flops 312 and 313. The outputs at the individual terminals Q of the flip-flops 312 and 313 are used to drive the pattern generator circuits 314 and 315. In the example of FIG. 4, when a coincidence is reached, the flip-flop 313 assumes "1" state at its terminal Q whereby the pattern generator circuit 315 is driven to generate an $i$ level pattern. If a non-coincidence is reached, the terminal Q of the flip-flop 312 stands at "1," and the pattern generator circuit 314 generates an $N-i$ level pattern. The flip-flop circuits 312 and 313 are reset at each clock, to allow pattern generation for each period T. FIG. 5*d* shows the timings of outputs 60' through 64' generated in the block 500' as a result of the above operation. After the reading of coincidence or non-coincidence by the clock pulse of FIG. 5*b*, the data as to whether this input is $i$ level or $N-i$ level is stored in the flip-flop 305 by the clock pulse of FIG. 5*c* so that this data is used for the succeeding operation. The output of the detection circuit 301 is applied to the terminal D of the flip-flop 305. Hence the memory content appearing at the output terminal Q is "0" when the input signal is the $i$ level, or "1" when it is $N-i$ level.

The operation of the block 400 is the same as that of the block 200 of FIG. 2. In FIG. 4, the edge trigger type D-flip-flop 412 is used in place of the logic circuits 204, 206, 207 and 209 of FIG. 2.

Briefly, as has been described, the system of the invention comprises, in the transmitter part, the blocks 100 and 200 installed in parallel as many as these are differential pairs of levels and nondifferential levels, and the block 500 coupled to the outputs of these blocks 100 and 200, and in the receiver part, the blocks 300 and 400 of FIG. 4 installed as many as there are the blocks 100 and 200, and the block 500' similar to the block 500 coupled to the outputs of the blocks 300 and 400.

Figure 6:
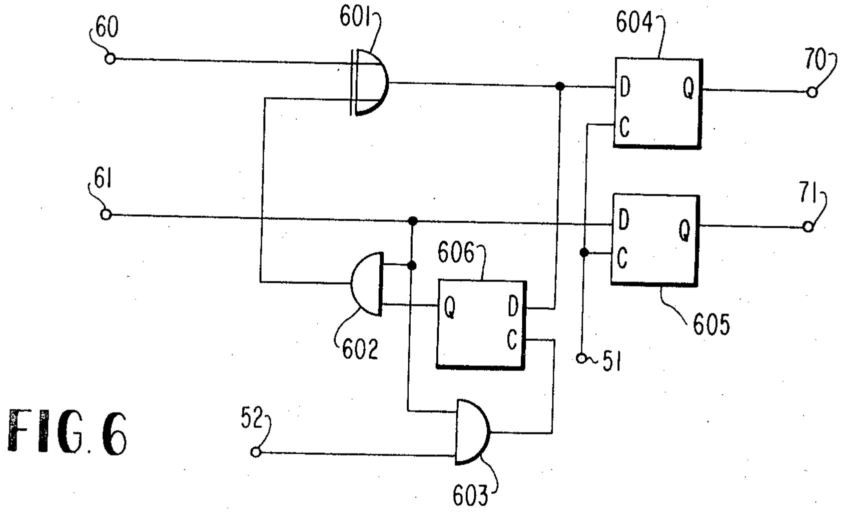
FIGS. 6 and 7 are circuit diagrams showing a differential coding circuit and an inverse conversion circuit operated for a quarternary signal according to this invention.
Figure 7:
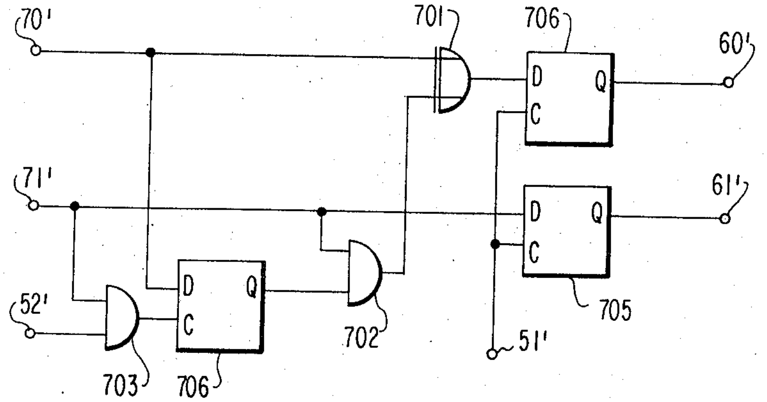

For the purpose of illustrating the invention, one general form of system has been described in detail. In a practical system where the number of level pairs is small, the circuitry may be simplified by taking advantage of the nature of the code pattern. For example, FIGS. 6 and 7 show a differential coding circuit on the transmitter side and an inverse conversion circuit on the receiver side, where the input level is quarternary (0 to 3). In this embodiment, the relationship between the two bits of inputs 60 and 61 and their quarternary levels is as follows.

| Quarternary level | 60 | 61 |
|---|---|---|
| 3 | "1" | "1" |
| 2 | "1" | "0" |
| 1 | "0" | "1" |
| 0 | "0" | "0" |

Figure 8:
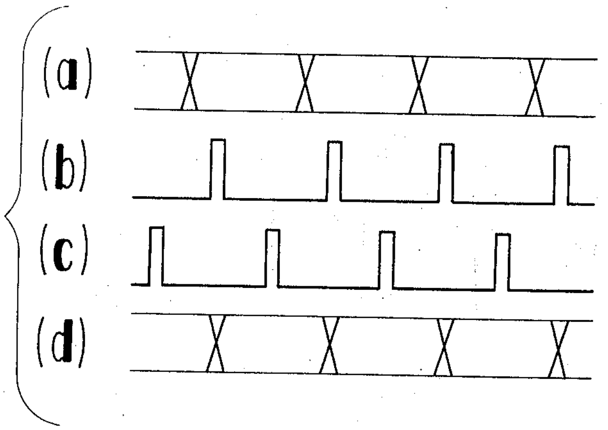
FIG. 8 is a waveform diagram illustrating the operation of the circuits of FIGS. 6 and 7.

Only the pair of 1-level and 3-level is differentially coded. In the differential coding on the transmitter side, when the input level is 1, the output remains at the preceding 1-level or 3-level. When the input is at 3-level, the preceding output at the inverted level is delivered. The signal at input levels 0 and 2 is transmitted directly without being subjected to the coding process. In the circuits shown in FIGS. 6 and 7, two kinds of clock pulses (FIG. 8*b* and 8*c*) are applied to the terminals 51 and 52 and also to the terminals 51' and 52'. The timing relationship among the input signal changing points (FIG. 8*a*), the first clock pulses (FIG. 8*b*), the second clock pulses (FIG. 8*c*), and the output signal changing points (FIG. 8*d*) is common to the circuits of FIGS. 6 and 7. These circuit constructions are simple, consisting essentially of one exclusive OR circuit, two AND circuits, and three edge trigger type D-flip-flops.

In FIGS. 6 and 7, the numerals 601 and 701 denote exclusive OR circuits, 602, 603, 702 and 703, AND circuits; and 604, 605, 606, 704, 705 and 706, edge-trigger type D-flip-flop circuits. From the above-mentioned quaternary-binary comparison table, the input signal at the terminal 61 of FIG. 6 need not be changed. It may be directly read out in response to the clock pulse from the terminal 51 at the flip-flop 605 to appear at the terminal 71. This output signal is received at the input terminal 71' and is directly read out in response to the clock pulse from the terminal 51' at the flip-flop 705 to appear at the terminal 61'.

Whether the input signals at the terminals 60 and 61 correspond to one of the of levels "zero" and "two" or to one of the of levels "one" and "three" can be decided by the input signal "0" or "1" at the terminal 61, respectively.

If the input signal at the terminal 61 is "0" (this means that the corresponding level is "zero" or "two"), the input signal at the terminal 60 is directly read out by the clock pulse 51 at the flip-flop 604 and appears at the terminal 70 because the output of 602 is "0." At this time, the information held in the flip-flop 606 is kept because the clock pulse 52 is inhibited at the gate 603.

If the input signal at the terminal 61 is "1" (this means that the corresponding level is "one" or "three"), the gate 602 becomes open state and the information held in the flip-flop 606 appears at the output of the gate 602.

If the input signal at the terminal 60 is "0" at this moment, (this means that the corresponding level is "one"), the output of the gate 601 becomes equal to that of the gate 602, and is read out by the preceding clock pulse from the terminal 51 (8 *b*) at the flip-flop 604 and then also by the succeeding clock pulse from the terminal 52 (8 *c*) at the flip-flop 606. Also, the information held in the flip-flop 606 is not changed although the flip-flop 606 repeats the reading of the output of the gate 601 in response to the succeeding clock pulse supplied via the open-state gate 603.

If both the signals at the terminals 60 and 61 are "1" (this means that the corresponding level is "three"), the output signal of the gate 601 is inverse to that of the gate 602 (or the information held in the flip-flop 606), and this inverse output signal of the gate 601 is read out by the preceding clock pulse at the flip-flop 604 and then also by the succeeding clock pulse at the flip-flop 606. Therefore, the new information is memorized at this time point in the flip-flop 606. The above described operation is summarized in the following table (Table 1).

Table 1

| Present level | | 3 | 2 | 1 | 0 |
|---|---|---|---|---|---|
| Present input | 60 | 1 | 1 | 0 | 0 |
| | 61 | 1 | 0 | 1 | 0 |
| Preceding output level | | 3 1 | — | 3 1 | — |
| Preceding output | 60 | 1 0 | — | 1 0 | — |
| | 61 | 1 1 | — | 1 1 | — |
| Gate 602 | | OPEN | CLOSE | OPEN | CLOSE |
| Gate 603 | | OPEN | CLOSE | OPEN | CLOSE |
| Gate 601 output | | 0 1 | input 60 | 1 0 | input 60 |
| Output | 70 | 0 1 | 1 | 1 0 | 0 |
| | 71 | 1 1 | 0 | 1 1 | 0 |
| Output level | | 1 3 | 2 | 3 1 | 0 |

In FIG. 7, when the input signal at the terminal 71' is "0" (the corresponding input level is "zero" or "two"), the input signal at the terminal 70' is directly read out by the preceding clock pulse from the terminal 51' at the flip-flop 704 and appears at the terminal 60' because the output signal of the gate 702 is "0." At this time, the information held in the flip-flop 706 is kept because the clock pulse from the terminal 52' is inhibited at the gate 703.

When the input signal at the terminal 71' is "1" (the corresponding input level is "one" or "three"), the information held in the flip-flop 706 appears at the output of the open-state gate 702, and is compared with the input signal from the terminal 70' by the exclusive OR circuit 701. The resultant coincidence or non-coincidence is read out by the preceding clock pulse at the flip-flip 704 as "0" or "1," respectively. Then, the information held in the flip-flop 706 is replaced by the new information at the input signal at the terminal 70' by the succeeding clock pulse from the terminal 52'. The operation of the receiving side is summarized in the following table (Table 2).

Table 2

| Present level | | 3 | 2 | 1 | 0 |
|---|---|---|---|---|---|
| Present input | 70' | 1 | 1 | 0 | 0 |
| | 71' | 1 | 0 | 1 | 0 |
| Preceding level | | 3 1 | — | 3 1 | — |
| Preceding input | 70' | 1 0 | — | 1 0 | — |
| | 71' | 1 1 | — | 1 1 | — |
| gate 702 | | OPEN | CLOSE | OPEN | CLOSE |
| gate 703 | | OPEN | CLOSE | OPEN | CLOSE |
| gate 701 output | | 0 1 | input 70' | 1 0 | input 70' |
| outputs | 60' | 0 1 | 1 | 1 0 | 0 |
| | 61' | 1 | 0 | 1 | 0 |
| Output level | | 1 3 | 2 | 3 1 | 0 |

According to the invention, as has been described, a relatively simple code conversion is performed on the transmitter side before the partial response coding, as well as on the receiver side after the partial response decoding whereby a 180° phase deviation may be tolerated on the demodulation carrier in the transmission band. This facilitates carrier phase control and makes it possible to realize simple and economical data transmission systems.

What is claimed is:

1. A multilevel code transmission system for transmission of a data signal in the form of an N-level, where N is an integer greater than two, code signal based on a partial response coding, comprising:

a transmitter including means for providing said data signal in the form of parallel binary codes:

means for monitoring each pair of input parallel binary codes representing N-i and i levels, where i represents all positive integers smaller than N, of said N-level code signal; means for delivering an output parallel binary code *i* level when the level monitored by said monitoring means is $N-i$ or *i* and is equal to the $N-i$ or *i* level last monitored by said monitoring means, and for delivering another output parallel binary code representing $N-i$ level when the level monitored by said monitoring means is $N-i$ or *i* and is different from the $N-i$ or *i* level last monitored by said monitoring means, means for converting a part of said input parallel binary codes and the outputs of said delivering means to said N-level code signal based on the partial response coding, and means for amplitude-modulating said N-level code signal thereby to transmit the modulated signal together with a pilot carrier signal to a receiver;

and a receiver including means for applying a coherent demodulation to said transmitted modulated signal thereby to regenerate said input parallel binary codes, means for monitoring each pair of said regenerated input parallel binary codes; and means for delivering a regenerated output parallel binary code representing *i* level when the level monitored by the last mentioned monitoring means is $N-i$ or *i* and is equal to the $N-i$ or *i* level last monitored by the last mentioned monitoring means, and for delivering another regenerated parallel binary code representing $N-i$ level when the level monitored by the last mentioned monitoring means is $N-i$ or *i* and is different from the $N-i$ or *i* level last monitored by said last mentioned monitoring means, thereby to regenerate said data signal in the form of parallel binary codes.

2. A multilevel code transmission system as recited in claim 1 wherein said means for monitoring in said transmitter includes:

code detecting means for providing $N-i$ and *i* designating codes corresponding to the $N-i$ level and the *i*-level of said *N*-level code signal, and said means for delivering in said transmitter includes:

memory means for storing an indication of the preceding delivered *i* designating or $N-i$ designating code, and comparing means responsive to the outputs of said code detecting means and said memory means for generating said *i* designating code when there is coincidence between said inputs and for generating said $N-i$ designating code where there is non-coincidence between said inputs.

3. A multilevel code transmission system as recited in claim 2 wherein said memory means includes bistable means responsive to said code detecting means for inverting the preceding $N-i$ designating code or the *i* designating code when said detecting means provides an output corresponding to the $N-i$ level.

4. A multilevel code transmission system as recited in claim 1 wherein said means for monitoring in said receiver includes:

code detecting means for providing $N-i$ and *i* designating codes corresponding to the $N-i$ level and the *i* level of said *N*-level code signal, and said means for delivering in said receiver includes:

memory means for storing an indication of the preceding delivered *i* designating or $N-i$ designating code, and comparing means responsive to the outputs of said code detecting means and the said memory means for generating said *i* designating code when there is coincidence between said inputs and for generating said $N-i$ designating code when there is non-coincidence between said inputs.

5. A multilevel code transmission system as recited in claim 1 wherein said means for monitoring in said transmitter includes:

first code detecting means for providing $N-i$ and *i* designating codes corresponding to the $N-i$ level and the *i* level of said *N*-level code signal;

and said means for delivering in said transmitter includes:

first memory means for storing an indication of the preceding delivered *i* designating or $N-i$ designating code, and first comparing means responsive to the outputs of said first detecting means and said first memory means for generating said *i* designating code when there is coincidence between said inputs and for generating said $N-i$ designating code when there is non-coincidence between said inputs, and wherein said means for monitoring in said receiver includes:

second code detecting means for providing $N-i$ and *i* designating codes corresponding to the $N-i$ level and the *i* level of said *N*-level code signal, and said means for delivering in said receiver includes:

second memory means for storing an indication of the preceding delivered *i* designating or $N-i$ designating code, and second comparing means responsive to the outputs of said second code detecting means and said second memory means for generating said *i* designating code when there is coincidence between said inputs and for generating said $N-i$ designating code when there is non-coincidence between said inputs.

* * * * *

UNITED STATES PATENT OFFICE
CERTIFICATE OF CORRECTION

Patent No. 3,829,779 Dated August 13, 1974

Inventor(s) Hiroshi Fujimoto

It is certified that error appears in the above-identified patent and that said Letters Patent are hereby corrected as shown below:

In The Specification:

Column 1, lines 9 and 10, after "through" delete "synchronous"

Column 2, line 29, delete "synchronized"

Column 3, line 1, after "not" delete "produced" and substitute -- processed --

Column 3, line 39, delete the parenthesis before "levels" and insert the parenthesis before "where"

Column 6, line 5, delete "circuit" and substitute -- result --

Column 6, line 6, after "resultant" delete "non-coincidence" and substitute -- coincidence -- same line, after "or" delete "discoincidence" and substitute -- non-coincidence --

Column 6, line 37, after "as" delete "these" and substitute -- there --

Column 7, line 29, before "of" (second occurrence) insert -- pair --

Column 7, line 30, before "of" (second occurrence) insert -- pair --

UNITED STATES PATENT OFFICE

CERTIFICATE OF CORRECTION

Patent No. 3,829,779 Dated August 13, 1974

Inventor(s) Hiroshi Fujimoto - 2 -

It is certified that error appears in the above-identified patent and that said Letters Patent are hereby corrected as shown below:

Column 7, line 39, after "is" "0." should be -- "0".

Column 7, line 57, after "the" , first occurrence, insert -- input --.

Column 8, line 32, after "or" "1," should be "1",

Signed and sealed this 26th day of November 1974.

(SEAL)
Attest:

McCOY M. GIBSON JR.
Attesting Officer

C. MARSHALL DANN
Commissioner of Patents